US012617144B2

(12) United States Patent
  Zhang et al.

(10) Patent No.: US 12,617,144 B2
(45) Date of Patent: May 5, 2026

(54) PIN DESIGNS FOR HIGH COF POLYMER MEMBRANES OR SEPARATOR MEMBRANES, MEMBRANE OR SEPARATOR TENSION MEASURING, AND RELATED METHODS

(71) Applicant: Celgard, LLC, Charlotte, NC (US)

(72) Inventors: Zhengming Zhang, Rock Hill, SC (US); Dickie J. Brewer, Clover, SC (US)

(73) Assignee: Celgard, LLC, Charlotte, NC (US)

( * ) Notice: Subject to any disclaimer, the term of this patent is extended or adjusted under 35 U.S.C. 154(b) by 64 days.

(21) Appl. No.: 18/700,182

(22) PCT Filed: Oct. 11, 2022

(86) PCT No.: PCT/US2022/046206

§ 371 (c)(1),
(2) Date: Apr. 10, 2024

(87) PCT Pub. No.: WO2023/069275

PCT Pub. Date: Apr. 27, 2023

(65) Prior Publication Data

US 2024/0416575 A1     Dec. 19, 2024

Related U.S. Application Data

(60) Provisional application No. 63/256,736, filed on Oct. 18, 2021.

(51) Int. Cl.
  *B29C 53/80*     (2006.01)
  *B29C 53/04*     (2006.01)
       (Continued)

(52) U.S. Cl.
  CPC .............. *B29C 53/80* (2013.01); *B29C 53/04* (2013.01); *H01M 10/0409* (2013.01);
       (Continued)

(58) Field of Classification Search
  None
  See application file for complete search history.

(56) References Cited

U.S. PATENT DOCUMENTS

2014/0020240 A1*   1/2014   Watanabe ......... H01M 10/0404
                                              29/730

FOREIGN PATENT DOCUMENTS

EP          1 261 063 A2 *  11/2002

* cited by examiner

*Primary Examiner* — Mohammad M Ameen
(74) *Attorney, Agent, or Firm* — J. Clinton Wimbish; Maynard Nexsen PC

(57)          ABSTRACT

In accordance with at least selected embodiments, aspects or objects, there are disclosed or provided new or improved pins adapted for use with high or higher COF polymer membranes or separator membranes (also known as sheets or films), polymer tension measuring, and/or related methods of use, of cell or battery manufacture, and/or the like. In certain embodiments, the new or improved pins are especially well suited for use with dry process polyolefin microporous membranes, separator membranes, or separators. In certain selected embodiments, the new or improved pins are especially well suited for use with dry process polyolefin microporous membranes, separator membranes, or separators in Z-fold or S-fold machines for the production of lithium ion pouch cells, lithium polymer pouch cells, lithium prismatic cells, and/or the like.

13 Claims, 15 Drawing Sheets

(51) Int. Cl.

| | |
|---|---|
| *H01M 10/04* | (2006.01) |
| *B29K 23/00* | (2006.01) |
| *B29L 31/00* | (2006.01) |
| *B29L 31/34* | (2006.01) |

(52) U.S. Cl.
CPC ... *B29K 2023/00* (2013.01); *B29L 2031/3468* (2013.01); *B29L 2031/755* (2013.01)

9D

9D

REV A          REV D          REV E
Fig. 9 Pins    Fig. 10 Pins   Fig. 11 Pins

PIN DESIGNS FOR HIGH COF POLYMER MEMBRANES OR SEPARATOR MEMBRANES, MEMBRANE OR SEPARATOR TENSION MEASURING, AND RELATED METHODS

RELATED APPLICATION DATA

The present application claims the benefit of U.S. PCT Application No. PCT/US2022/046206, filed Oct. 11, 2022, which claims priority to U.S. Provisional Application No. 63/256,736, filed Oct. 18, 2021, each of which is incorporated herein by reference in its entirety.

FIELD

The present disclosure or invention relates to new or improved pins, fingers or paddles adapted or suited for use with high COF polymer membranes or separator membranes (also known as sheets or films), polymer tension measuring, and/or related methods of use, of cell or battery manufacture, and/or the like. In certain embodiments, the new or improved pins are especially well suited for use with dry process polyolefin microporous membranes, separator membranes, or separators. In certain selected embodiments, the new or improved pins are especially well suited for use with dry process polyolefin microporous membranes, separator membranes, or separators in Z-fold or S-fold machines for the production of lithium ion pouch cells, lithium polymer pouch cells, lithium prismatic cells, and/or the like.

SUMMARY

The present disclosure or invention relates to new or improved pins, fingers or paddles adapted or suited for use with high COF polymer membranes or separator membranes (also known as sheets or films), polymer tension measuring, and/or related methods of use, of cell or battery manufacture, and/or the like. In certain embodiments, the new or improved pins are especially well suited for use with dry process polyolefin microporous membranes, separator membranes, or separators. In certain selected embodiments, the new or improved pins are especially well suited for use with dry process polyolefin microporous membranes, separator membranes, or separators in Z-fold or S-fold machines for the production of lithium ion pouch cells, lithium polymer pouch cells, lithium prismatic cells, and/or the like In certain possibly preferred embodiments, aspects, or objects, the new or improved pins are contoured, shaped, designed, or modified to reduce the points of contact with the membrane or separator, to reduce the surface area of the pin, to reduce the face friction, to change the friction to a line friction, to change the friction to a point friction, to reduce the initial static friction force, includes contours, includes grooves, includes beads, includes pits, includes rollers, includes wheels, includes bearings, includes friction reducing materials, includes friction reducing coatings, provides at least a 10% reduction in membrane to pin face friction, provides at least a 70% reduction in membrane to pin face friction, provides at least a 90% reduction in membrane to pin face friction, facilitates the use of dry process separator membranes, is combined with tension measuring and control to reduce damage to thin, high COF membranes, and/or combinations thereof.

BRIEF DESCRIPTION OF THE DRAWINGS

FIGS. 5, 6, 7, 8, and 9 are schematic perspective views illustrating the new pins in the battery making equipment.

DETAILED DESCRIPTION

Figures 9, 9A, 9B, 9C, 9D:
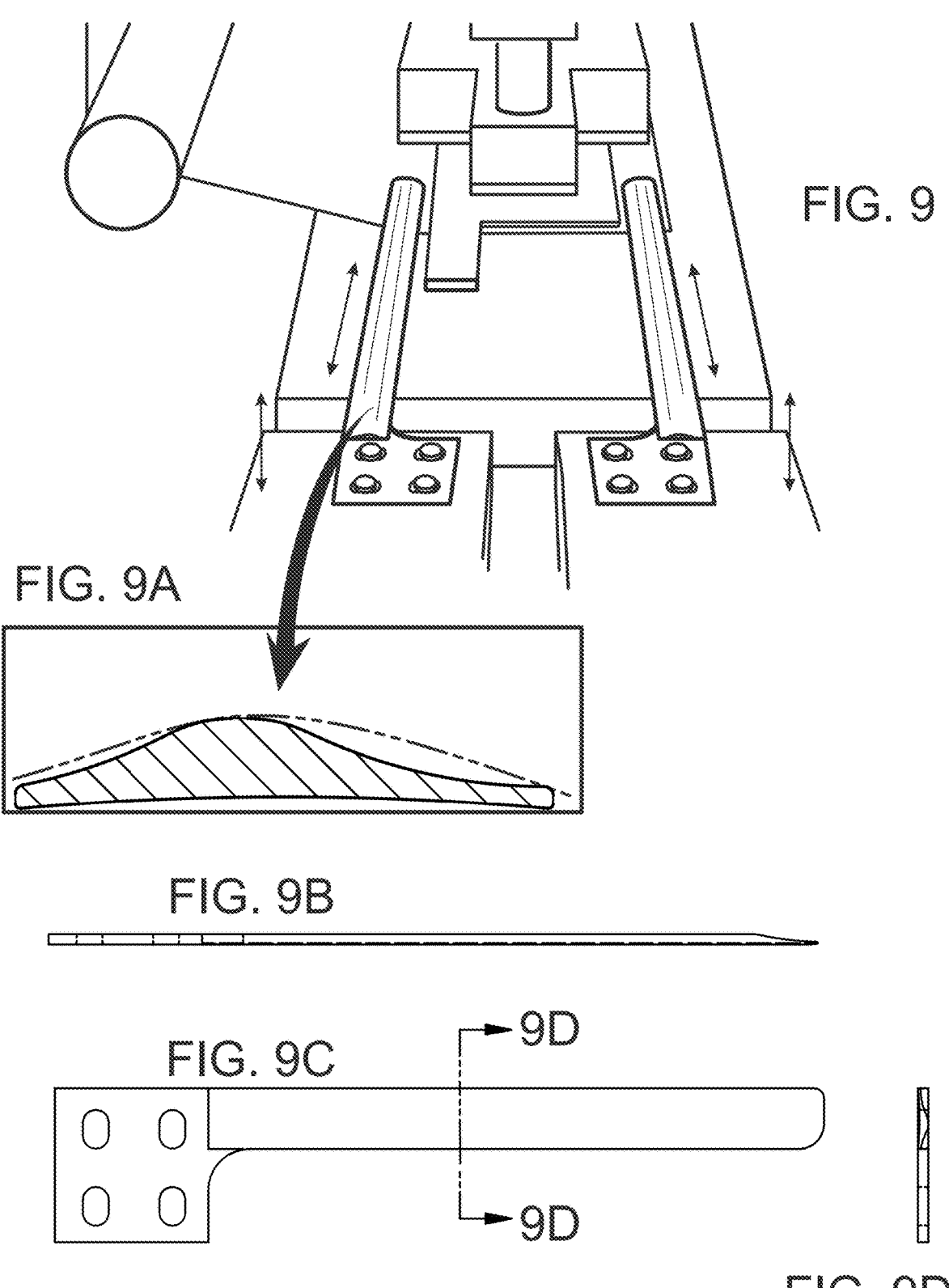
FIGS. 9, 9A-9D, and a portion of FIGS. 12 and 13 show a first elongate contoured inventive pin embodiment (Rev A).
Figures 10, 10A, 10B, 10C:
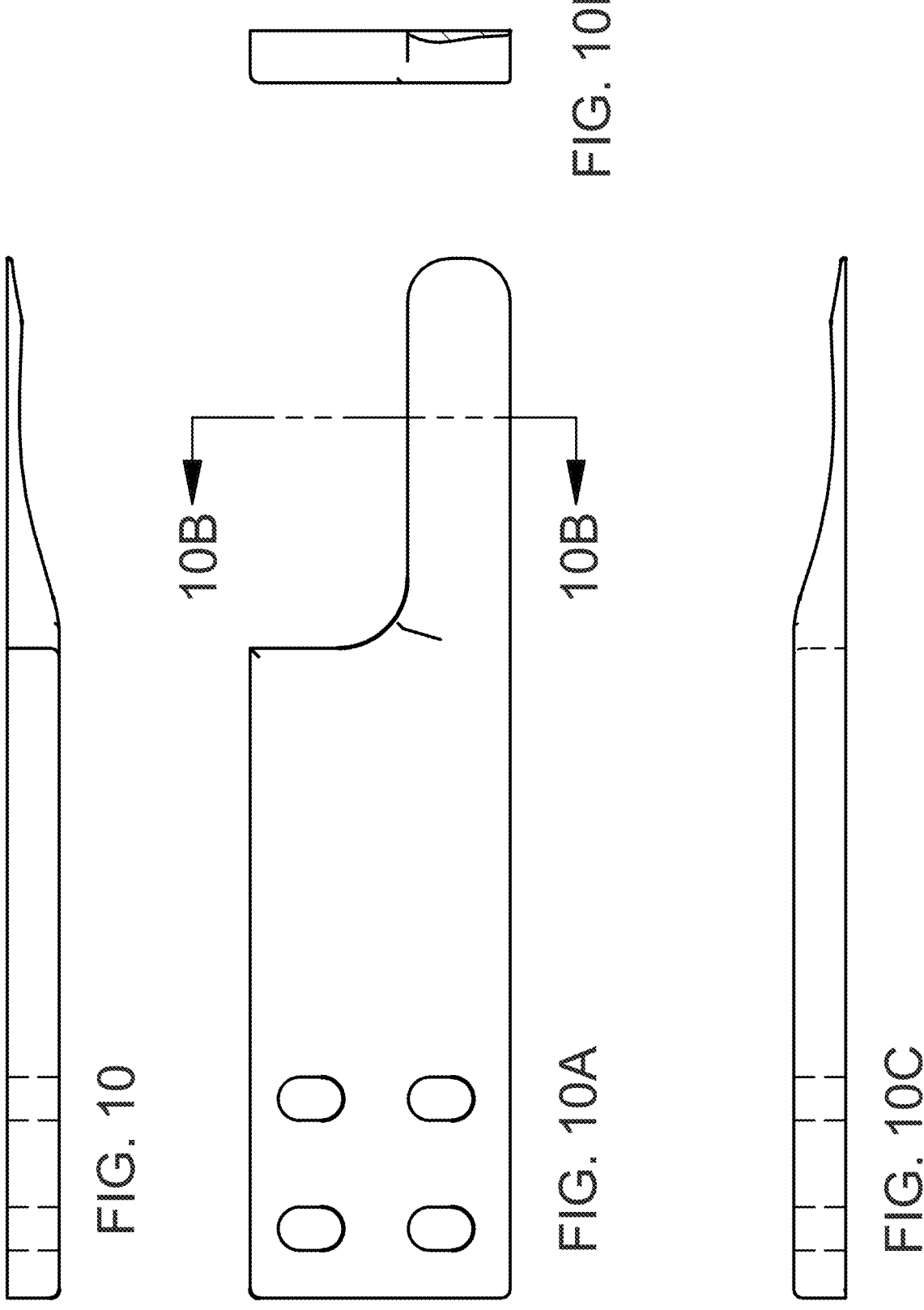
FIGS. 10, 10A-10C, and a portion of FIGS. 12 and 13 show a second shorter contoured inventive pin embodiment (Rev D).
Figures 11, 11A, 11B, 11C, 11D:
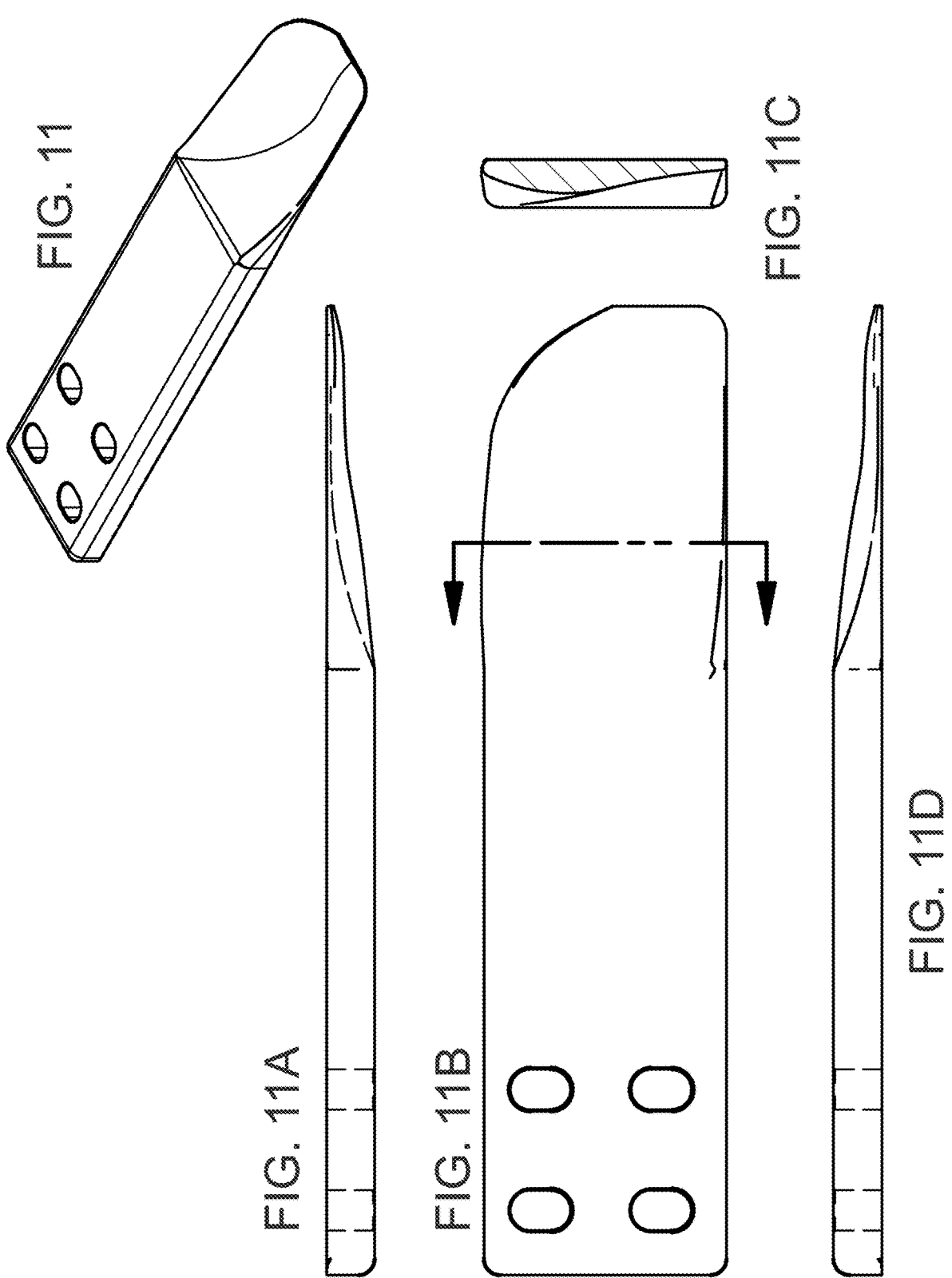
FIGS. 11, 11A-11D, and a portion of FIGS. 12 and 13 show a third broader contoured inventive pin embodiment (Rev E).
Figure 12:
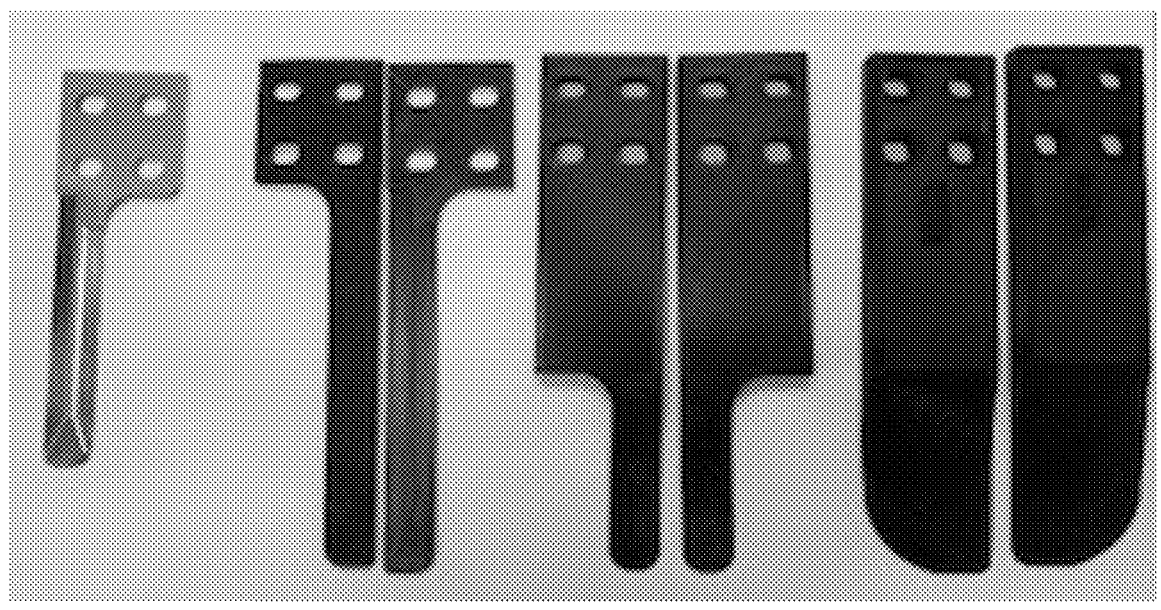

Pins, fingers or paddles described herein can incorporate any compositions, architectures and/or profiles for minimizing contact with the membranes and/or enhancing membrane passage over the pins with minimal friction and/or degradation. In some embodiments, the pins can exhibit a contoured design or profile. The contoured pin design can adopt a variety of shapes, while maintaining the contoured principle. For example, the entire surface can have a curved (contoured) shape that reduces or eliminates all points of contact with the membrane other than the folded edge and the redirection plan (apex contours). This can minimize the contact area of the pin to 3 points. In some embodiments, the contoured shape resembles a portion of an airplane wing, as illustrated in FIG. 9A. The membrane (dashed line) contacts the pin at each edge of the pin and at the apex of the convex contour. Additionally, in some embodiments, the apex of the contour can be partitioned into multiple apexes. For example, one more concave regions can separate apex points, thereby reducing surface area contact with the membrane.

The convex contour can exhibit any desired radius of curvature. Radius of curvature can be selected to minimize contact with the membrane while facilitating passage of the membrane without increasing tension in the membrane. As illustrated in FIG. 9A, the convex apex transitions into concave regions on both sides. In some embodiments, the radius of curvature of at least one of the concave regions is greater than the radius of curvature of the convex apex. Alternatively, the radius of curvature of the convex apex is greater than the radius of curvature of at least one or the concave regions. Moreover, in some embodiments, the concave regions exhibit the same radius of curvature or differing radii of curvature. Additionally, the endpoints of the contoured profile can be curved, chamfered, or beveled to reduce contact/friction with the membrane. In some embodiments, the endpoints contacting the membrane can have a radii of curvature less than the apex radius of curvature. These structural properties can be adjusted depending on desired interaction with the membrane. Various non-limiting embodiments of the contoured design are represented by Rev A, Rev D and Rev E as illustrated in FIGS. 9-13.

Additionally, the contour pins can be fabricated from one or more materials exhibiting a low coefficient of friction (COF). Such low COF material can preclude the need to coat the pins with a low COF coating. Low COF materials should exhibit mechanical properties and dimensional stabilities suitable for use in Z-fold and/or S-fold apparatus. For example, in some embodiments, the low COF materials can have mechanical properties and dimensional stabilities similar to steel, such as tool steel, while exhibiting COF lower than polished steel. Employing low COF materials can reduce pin manufacturing costs and time.

In some embodiments, pin surfaces can be coated with a low COF material. Any desired coating may be applied. In some embodiments, the coating is applied by chemical vapor deposition (CVD), physical vapor deposition (PVD) or combinations thereof. Coatings applied by CVD and/or PVD can comprise low COF polymers, ceramic materials and/or refractory materials including PTFE, nitrides, carbides, sulfides, carbonitrides, oxynitrides, or oxycarbonitrides of aluminum and/or one or more transition metals.

A low COF material may be wrapped over one or more surfaces of the pin. For example, a fluoropolymer tape, such as polytetrafluoroethylene (PTFE) or derivative thereof, a synthetic fluoropolymer made up of tetrafluoroethylene monomer, such as poly (1,1,2,2 tetrafluoroethylene), a thermoplastic polymer, (C2F4)n, may have repetitive or n numbers of C2F4 units, has an ability to maintain high strength, toughness, and self-lubrication at low temperatures (around 5 K), and/or good flexibility at temperatures above 194 K, can be wrapped on all membrane contact surfaces of the pin. Coatings can be applied to the entire pin, or only applied to pin surfaces contacting the membrane. For example, pin surface 10A in FIG. 4 can be wrapped with low COF tape. The remainder of the pin 10 is not required to be wrapped in the low COF tape.

With respect to at least FIGS. 9-13 of the drawings, the new or improved "contoured" pin design embodiments like Rev A, Rev D and Rev E can be used to replace the typical conventional pin to reduce the points of contact and/or the effective pin surface area. The contour pin design can take many overall shapes which embody or contain the contoured principle. Preferably, the entire effective pin surface has a curved (contoured) shape (similar to an airplane wing) that eliminates all points of contact other than the folded film edge and the redirection plan (apex of the contours). This minimizes the contact area of the pin to the film to 3 points or less.

Also, the contour pins can be made of or with low COF material and therefore may not need to be coated or wrapped with low COF material. For example, shape A can be made from steel and then plasma coated with a low COF material, or if the base material of shape A is stable enough to make the pin from and has a lower coefficient of friction (COF) than polished steel, it may work as intended without a coating. This may greatly reduce the cost of the pin manufacture. It also may greatly reduce the pin manufacture time.

Figure 13:
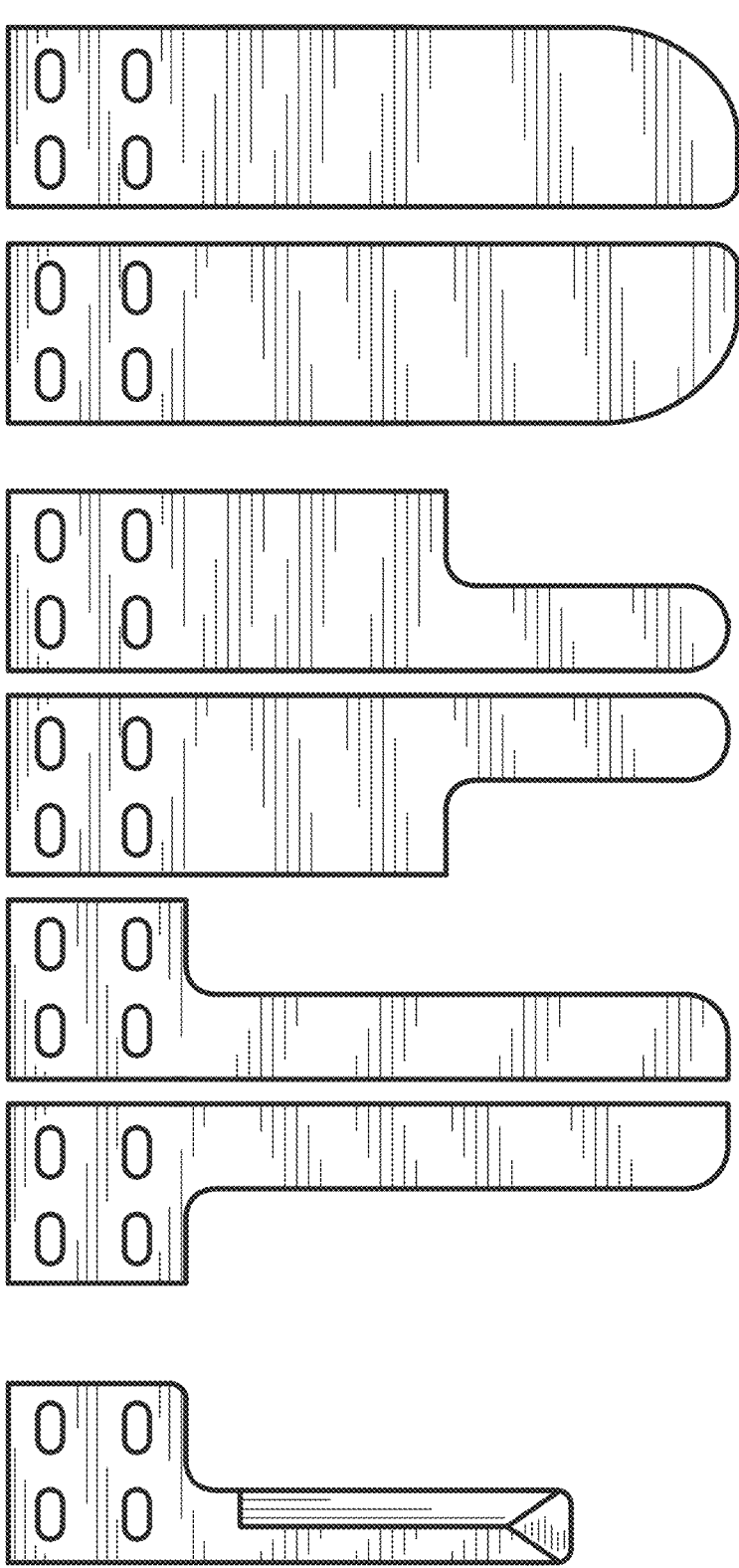

Prototypes of contour shapes Rev A, Rev D and Rev E were 3D printed from PLA (see FIG. 13). Other materials (such as ABS and PETG) may be used because of their different or lower COF.

Figures 14, 14A:
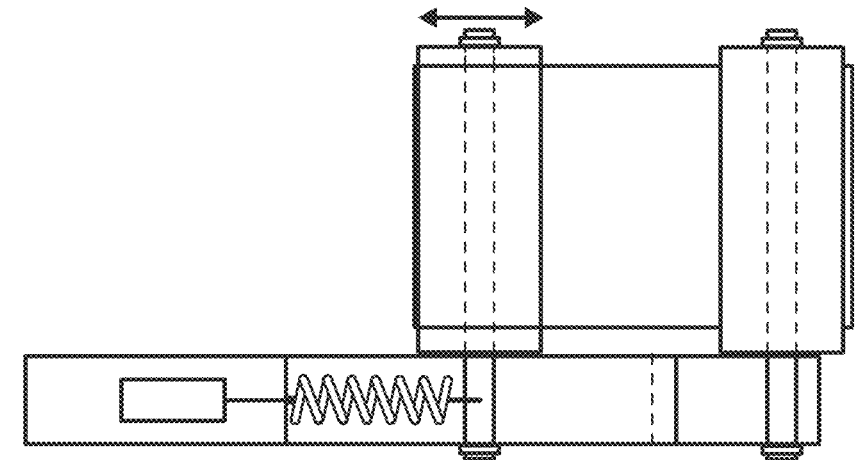
FIGS. 14, 14A, 15, and 16 relate to a tension measuring device and method that may be used in combination with one or more improved pins to facilitate the use of high COF membranes or separators in an automated battery making machine. The exemplary tension measuring device of FIGS. 14, 14A, and 15, includes a support structure, two spaced lower idler rollers, an upper dancing or vertically moving idler roller, a spring pulling the dancer roll upward, and a force measuring device or load cell that measures the force (tension in or on the film that passes over the three rollers) and can feed a signal to a cell phone or computer to provide feedback so the machine or operator can control or reduce the tension on the membrane, separator or film. In addition to using new low COF pins and a tension measuring device, in at least a preferred embodiment, the pin speed is also controlled or reduced to prevent damage to the thin film or sheet.
Figure 15:
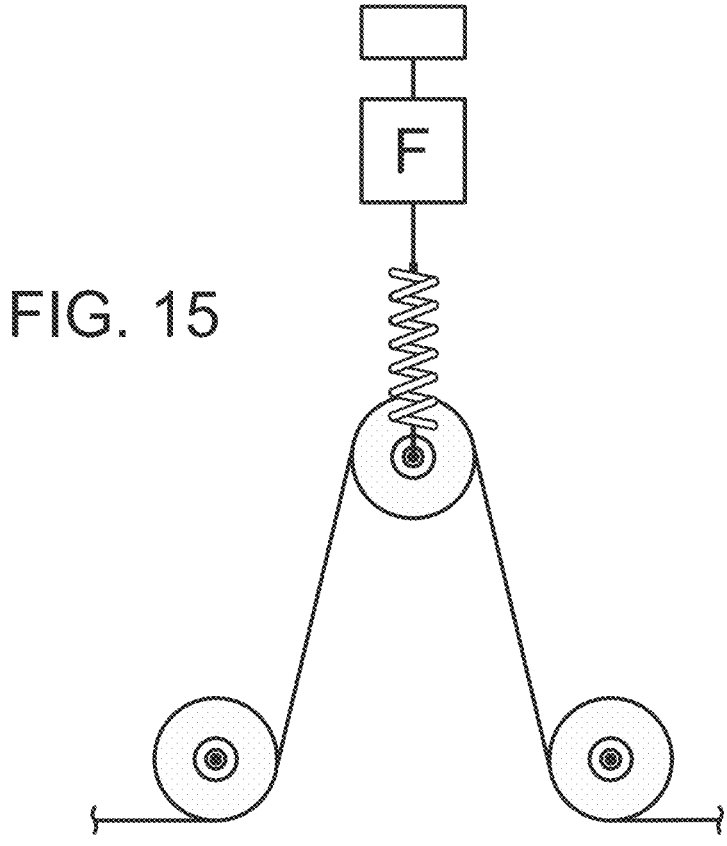
Figure 16:
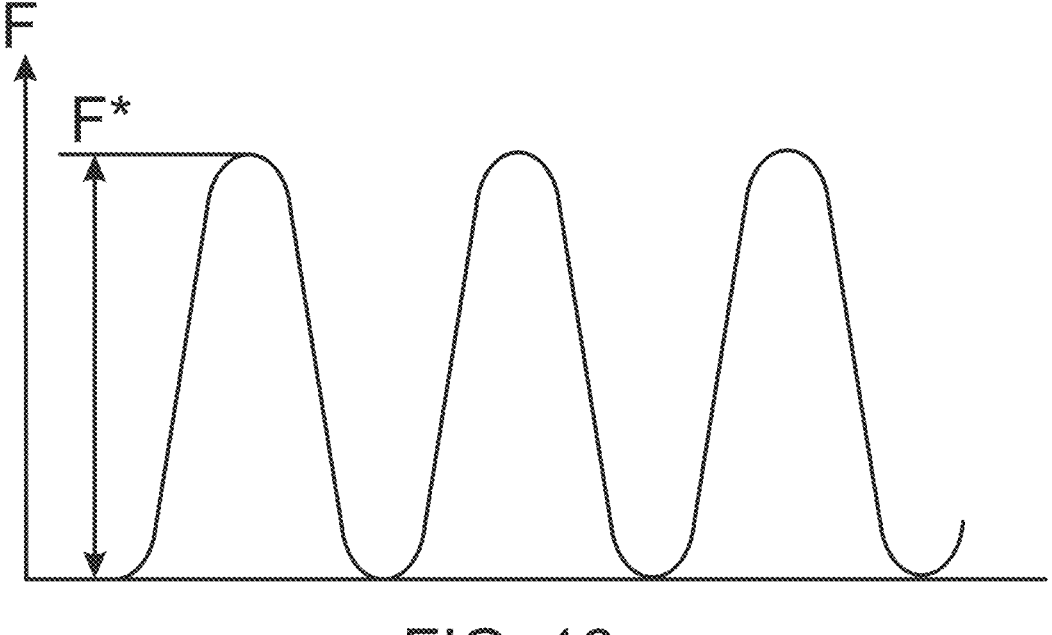

With respect to FIGS. 14-16, such equipment is a variation of a load cell or device for measuring tension in a film. For example, the spring loaded roll may be replace with a load cell. The load cell can be tied into line controls to control film speeds or tensions in the equipment.

Figure 1:
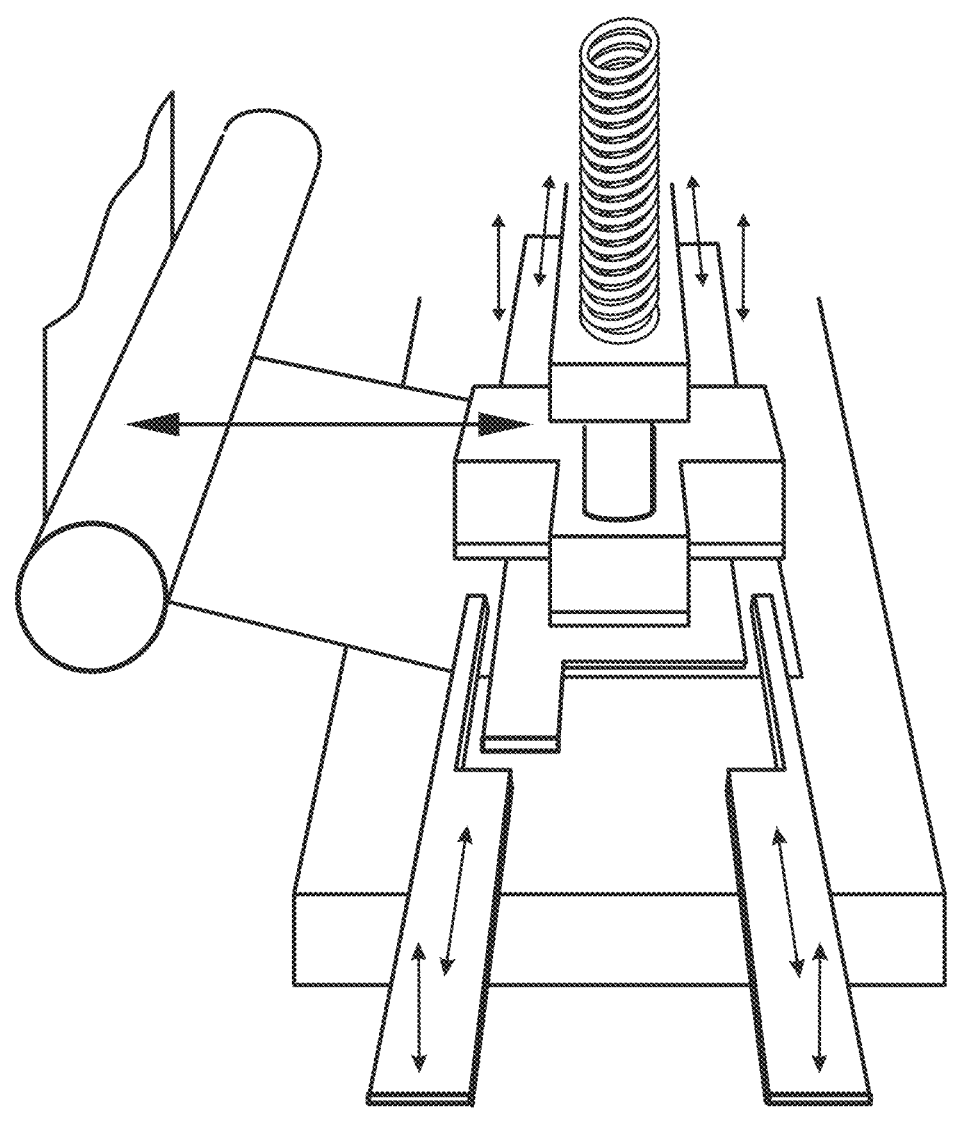
FIGS. 1-4 are schematic perspective view illustrations of a typical Auto Lamination Stacking Machine For Lithium ion Battery (such as a TMAX machine) with horizontally and vertically moving pins or fingers holding the thin separator sheet in place while electrodes or plates are stacked on top by a vertically moving member so that the electrodes are located or inserted between the S-folds or Z-folds of the separator. Such typical rectangular and planar pins or fingers may destroy thin, high or higher coefficient of friction (COF) membranes or separators as the friction forces are too high for the thin film (typical lithium battery separators are 50 um or less thick, microporous polyolefin membranes (such as monolayer PP membranes or trilayer PP/PE/PP membranes).
Figure 2:
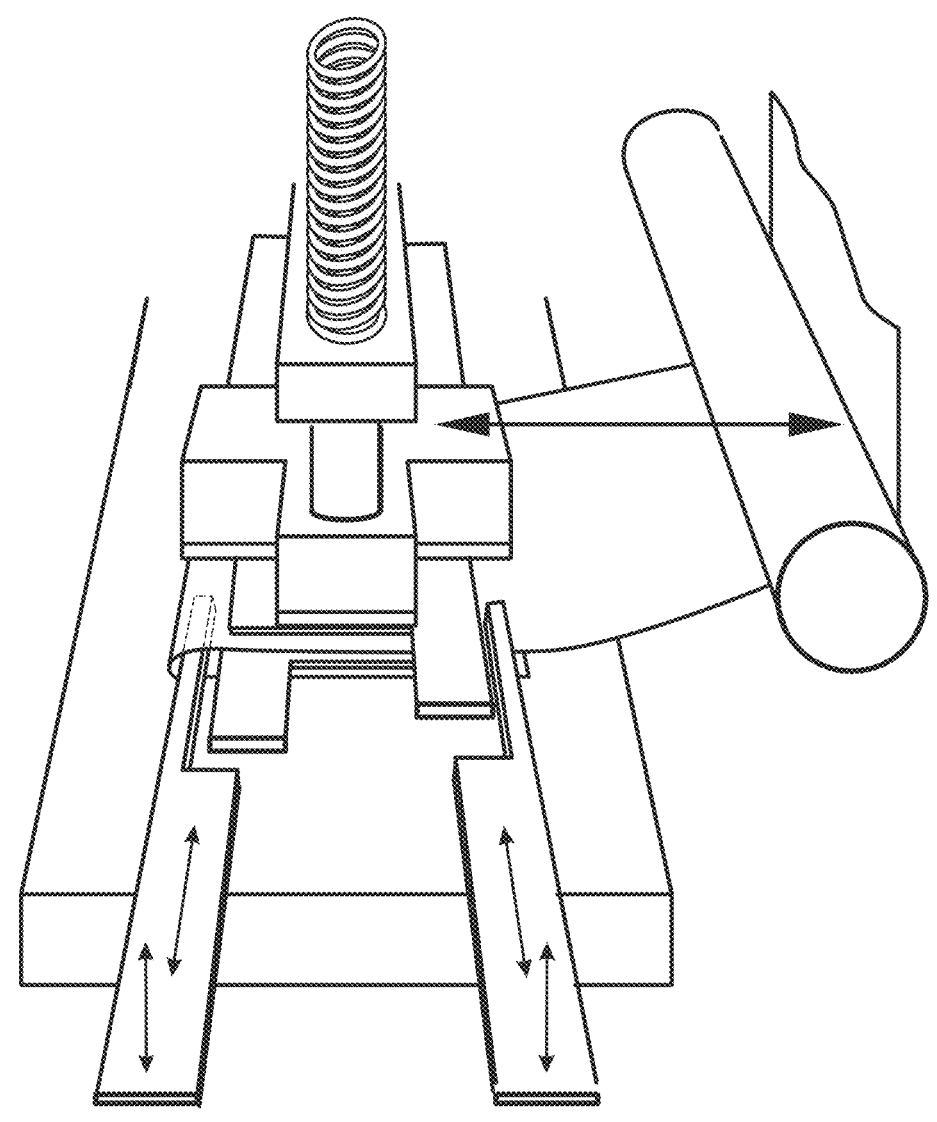
Figure 3:
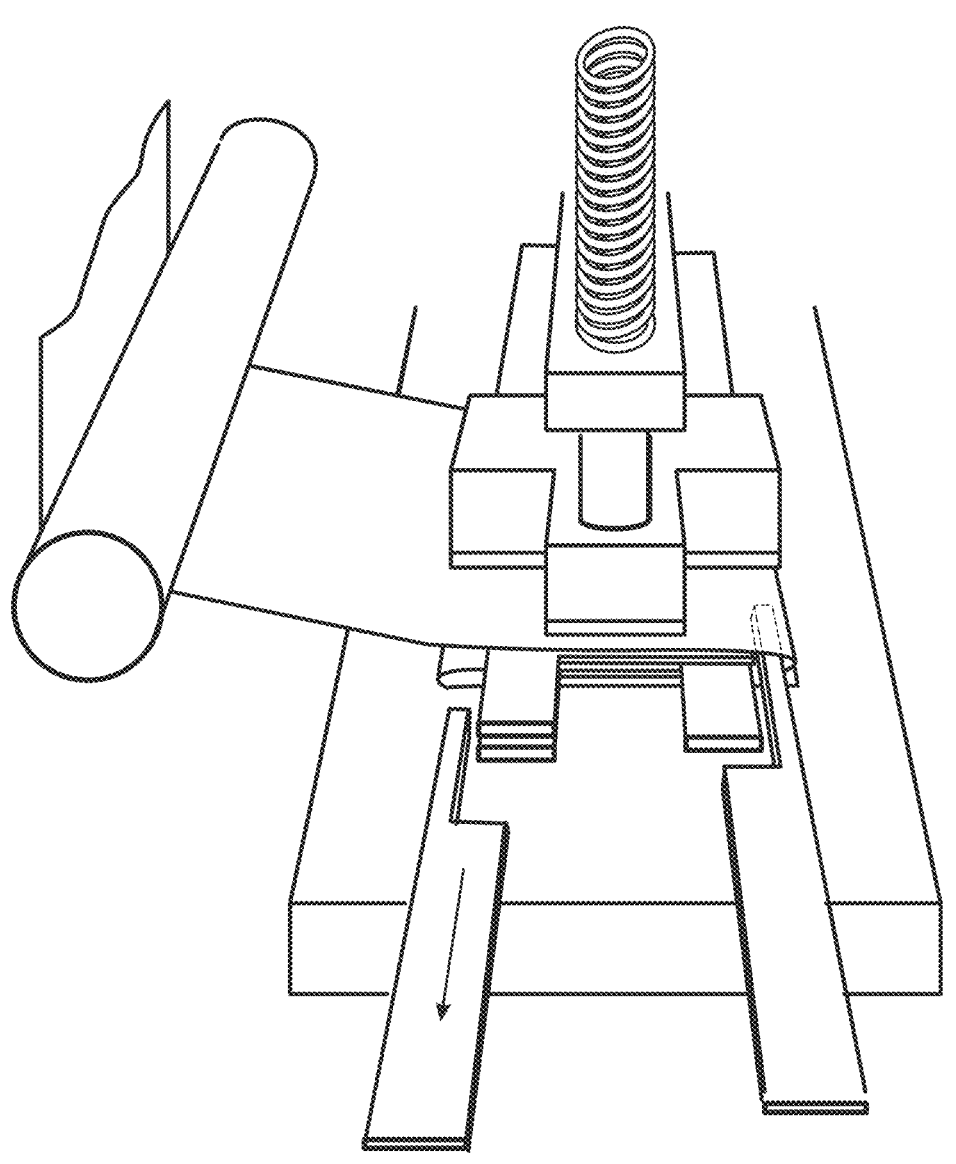
Figure 4:
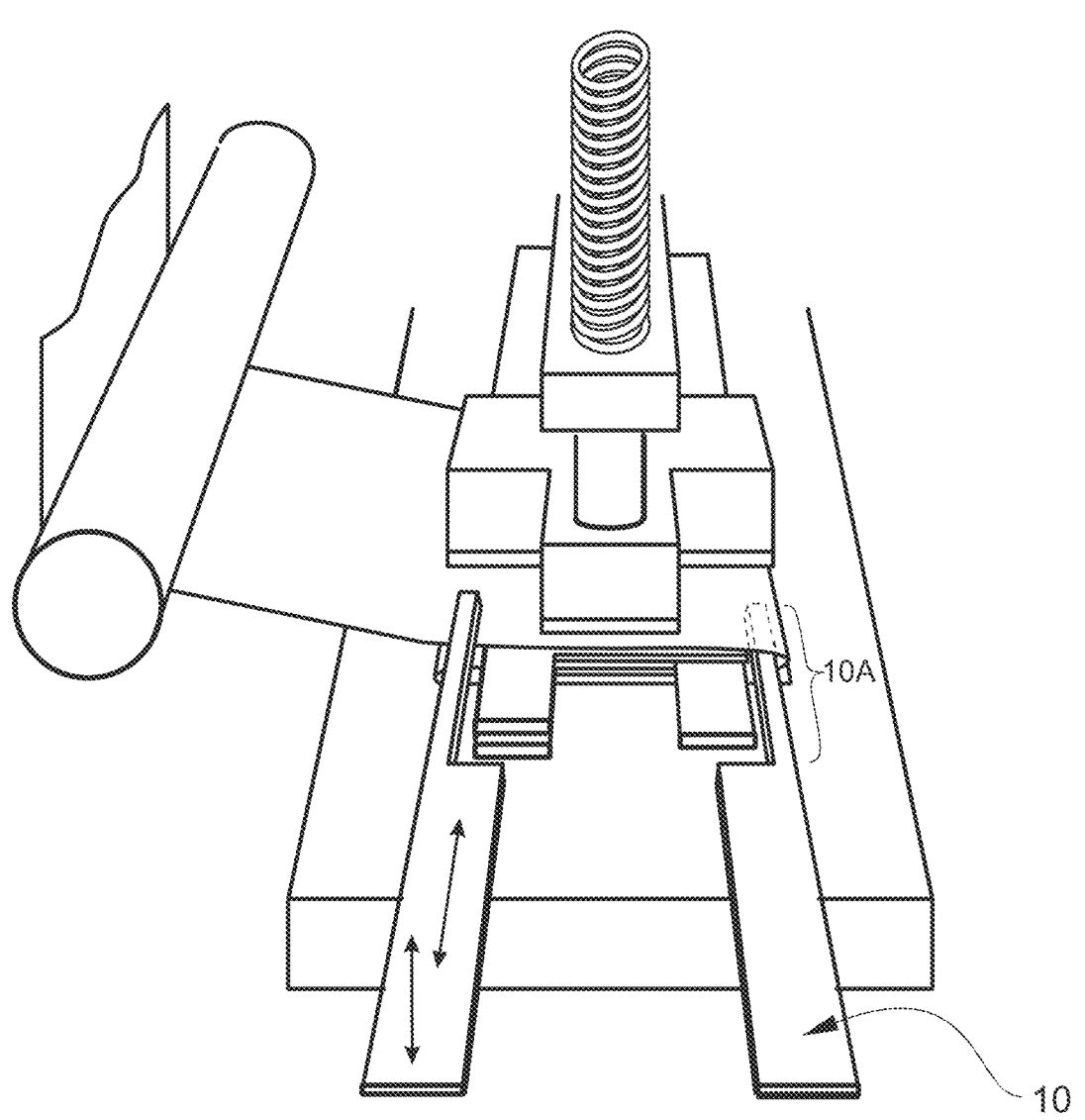
Figures 5, 5A, 5B, 5C, 5D, 5E:
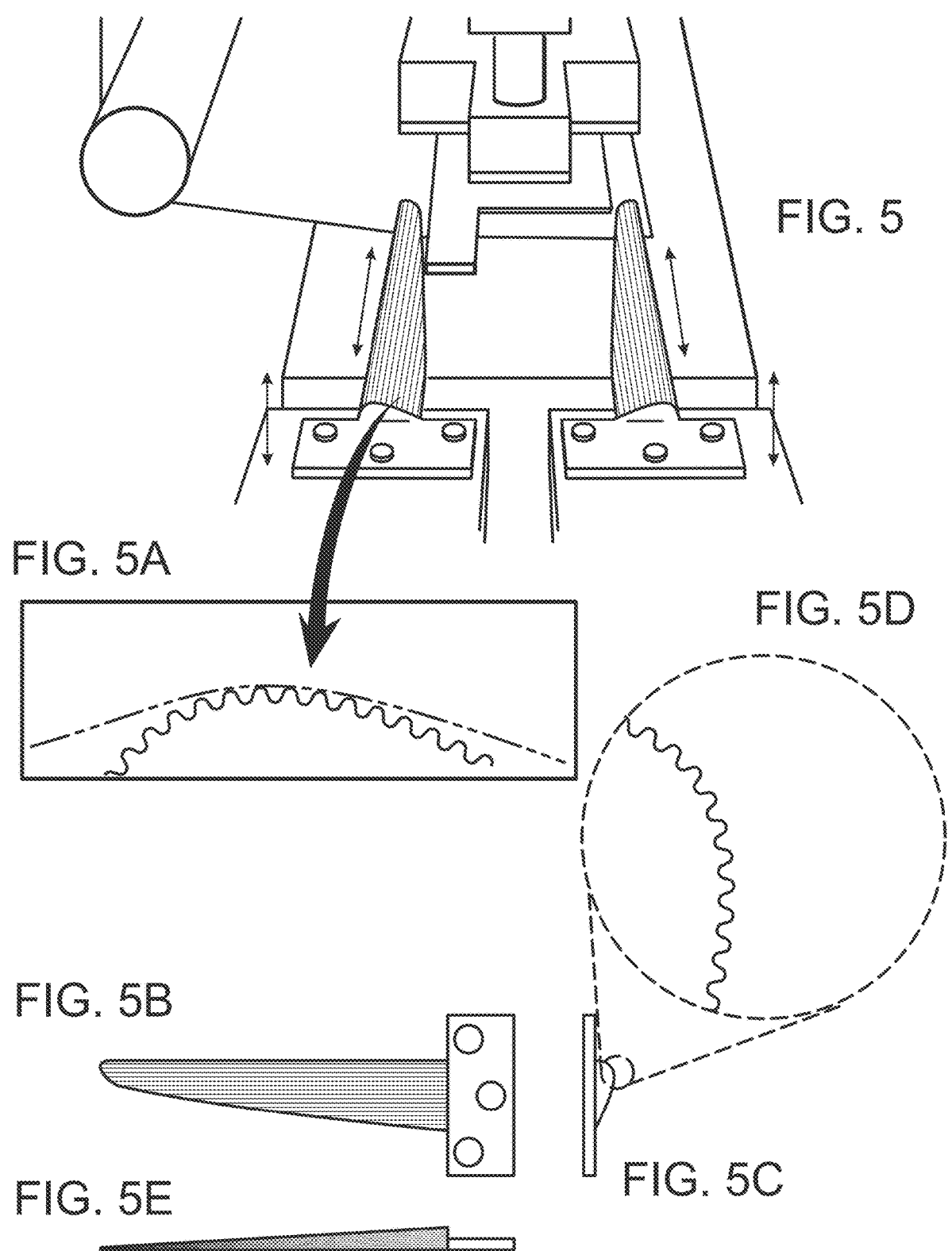
FIGS. 5 and 5A-5E show a channeled or grooved surface inventive pin embodiment.
Figures 6, 6A, 6C, 6D, 6E:
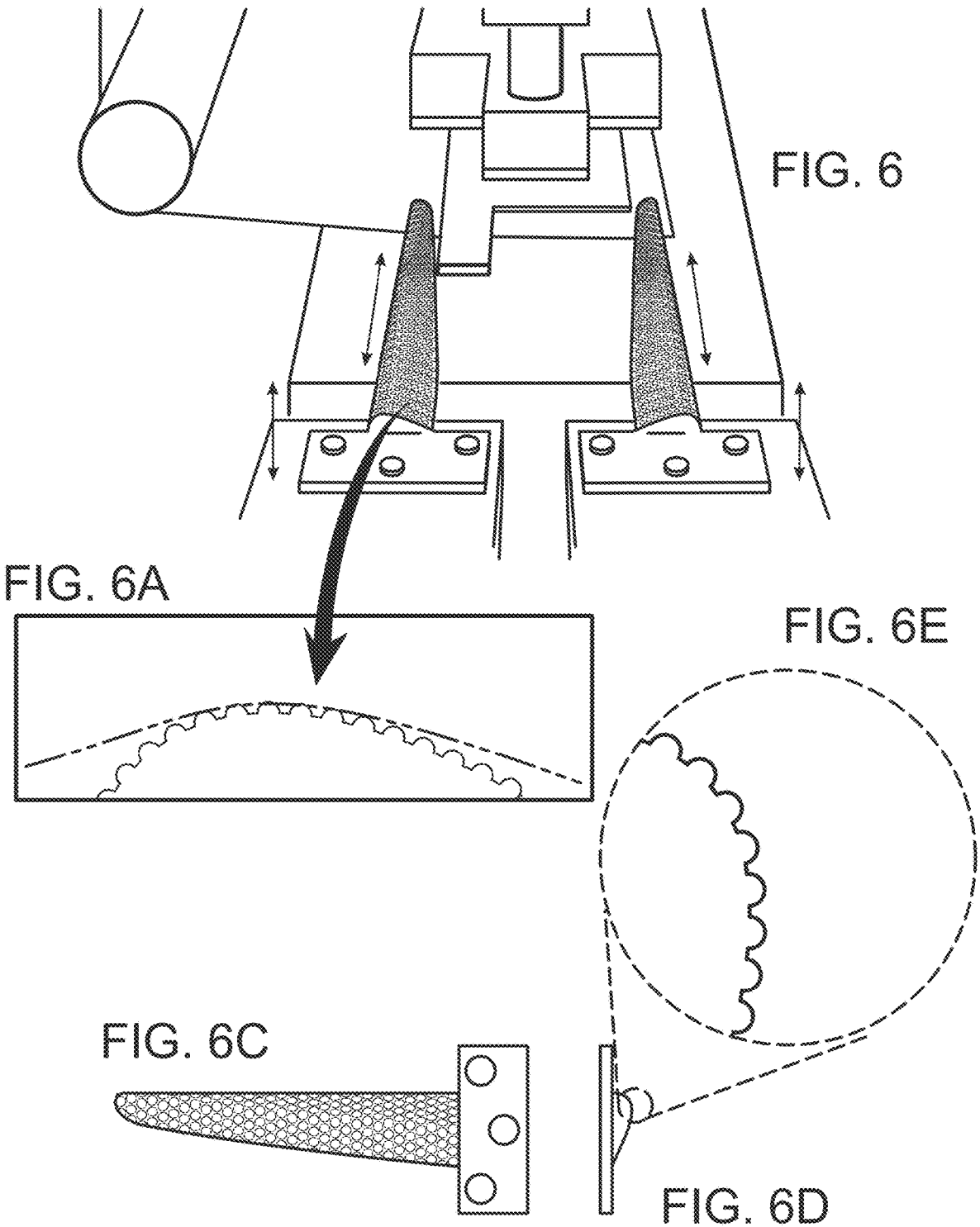
FIGS. 6, 6A and 6C-6E show a beaded or rounded protrusions surface inventive pin embodiment.
Figures 7, 7A, 7B, 7C, 7D:
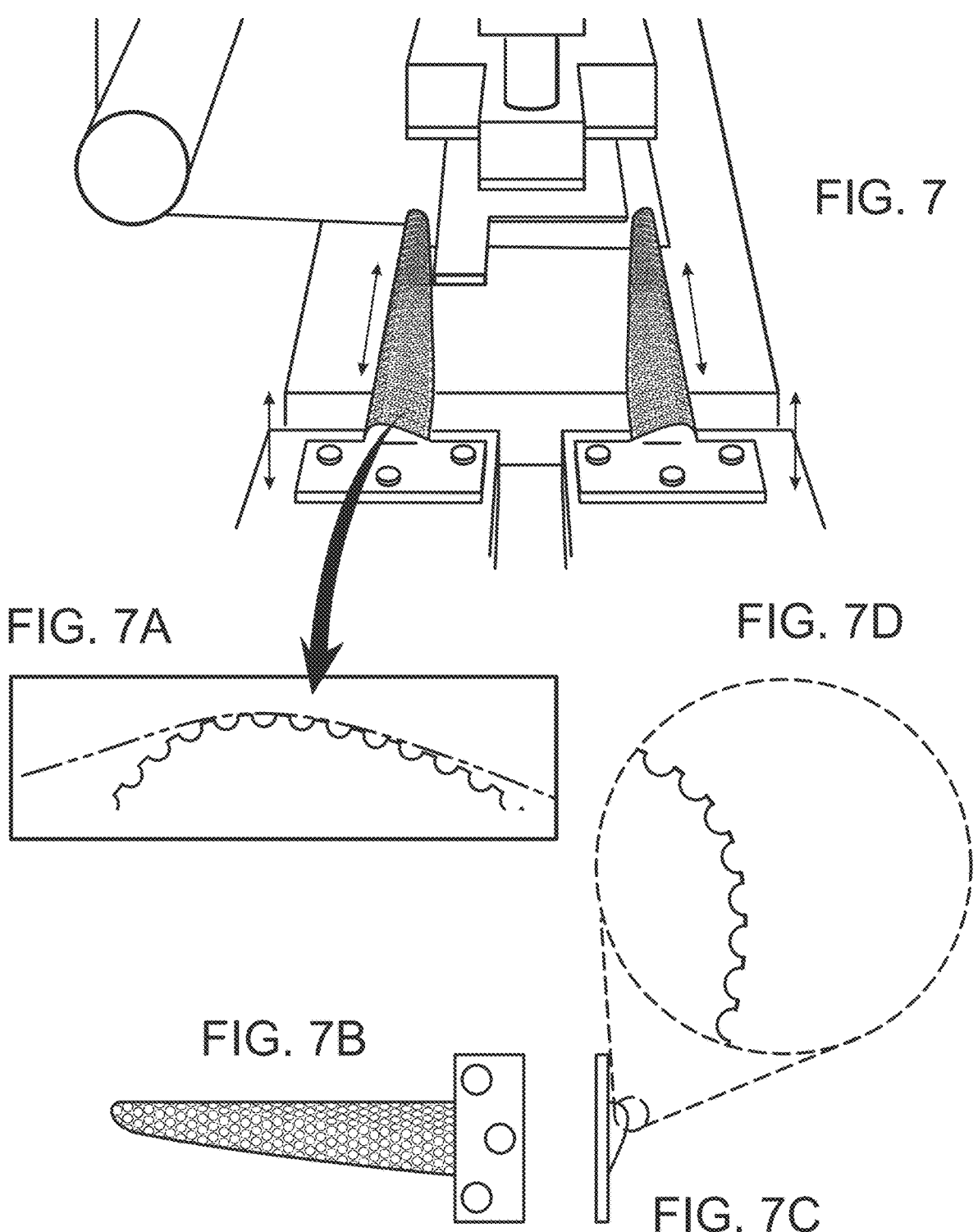
FIGS. 7 and 7A-7D show a dented or pitted surface inventive pin embodiment.
Figures 8, 8A, 8B, 8C, 8D:
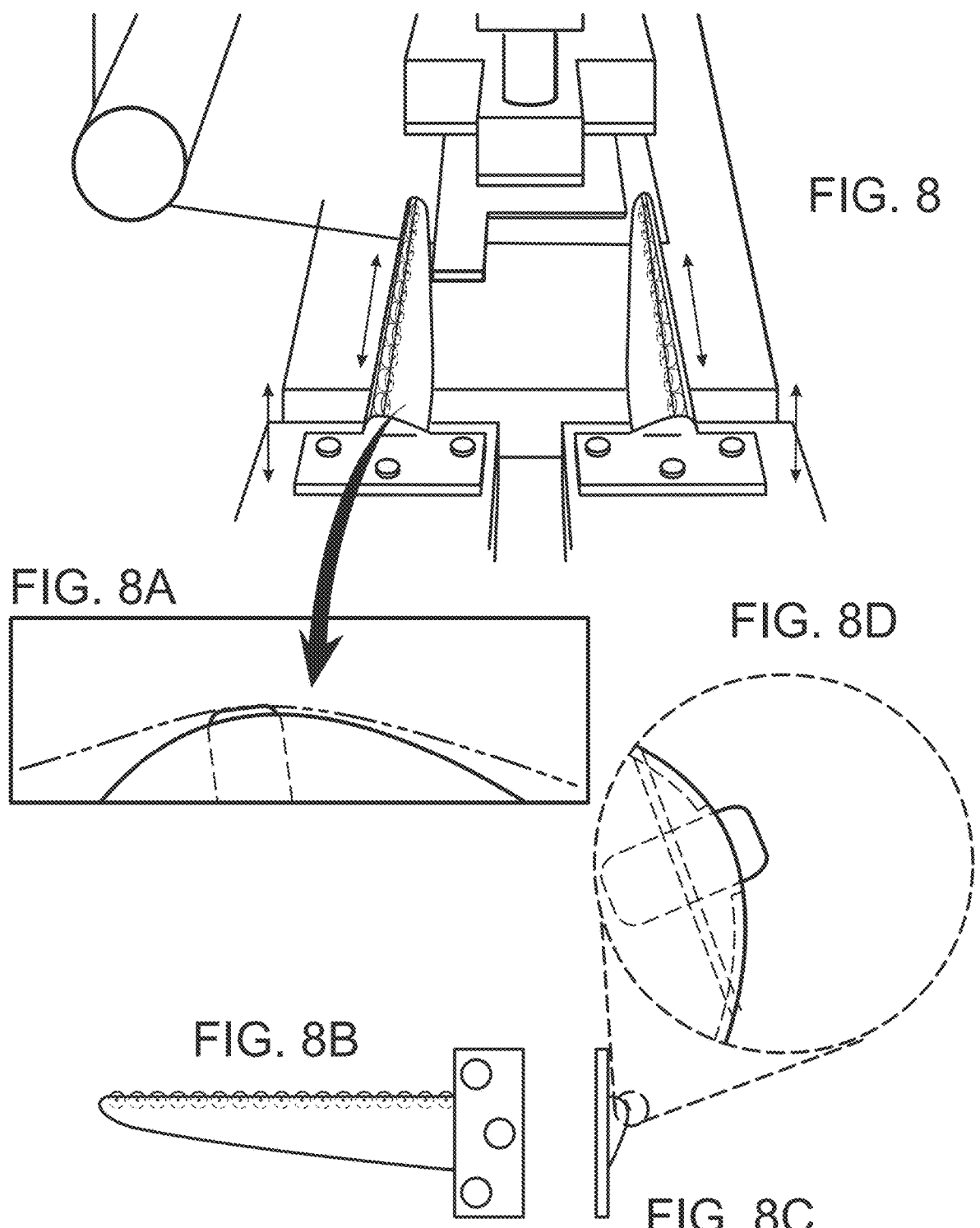
FIGS. 8 and 8A-8D show a roller or bearing edged and smooth surface inventive pin embodiment.

In one non-limiting example, we ran both the contoured pin with the "fluted" design and we also modified the rectangular pins with a special, flexible, PTFE tape on them (see FIG. 4). Both pins, fluted and taped, were successful in running Celgard® dry process separator.

In one possibly preferred embodiment, the "contoured" pin design, is represented by Rev A, Rev D and Rev E. The contour pin design can take many overall shapes, but may preferably contain the contoured principle. The entire surface has a curved (contoured) shape (similar to an airplane wing) that eliminates all points of contact other than the folded edge and the redirection plan (apex of the contours). This minimizes the contact area of the pin to the film to 3 points. This is shown in FIG. 9.

Also, the contour pins can actually made with low COF (coefficient of friction) of material and may not need to be coated. Originally, shape A was intended to be made from steel and then plasma coated with a low COF material. However, if the base material is stable enough to make the pin from and has a lower coefficient of friction (COF) than polished steel, it should work as intended. This may greatly reduce the cost of the pin manufacture. It may also greatly reduce the pin manufacture time.

In another non-limiting example, we 3D printed contour shapes: Rev A, Rev D and Rev E from PLA (see pictures). The other materials (ABS and PETG) noted on the drawing have a different COF.

In accordance with at least selected embodiments, aspects or objects, there are disclosed or provided new or improved pins adapted for use with high or higher COF polymer membranes or separator membranes (also known as sheets or films), polymer tension measuring, and/or related methods of use, of cell or battery manufacture, and/or the like. In certain embodiments, the new or improved pins are especially well suited for use with dry process polyolefin microporous membranes, separator membranes, or separators. In certain selected embodiments, the new or improved pins are especially well suited for use with dry process polyolefin microporous membranes, separator membranes, or separators in Z-fold or S-fold machines for the production of lithium ion pouch cells, lithium polymer pouch cells, lithium prismatic cells, and/or the like.

In certain possibly preferred embodiments, aspects, or objects, the new or improved pins are contoured, shaped, designed, or modified to reduce the points of contact with the membrane or separator, to reduce the surface area of the pin, to reduce the face friction, to change the friction to a line friction, to change the friction to a point friction, to reduce the initial static friction force, includes contours, includes grooves, includes beads, includes pits, includes rollers, includes wheels, includes bearings, includes friction reducing materials, includes friction reducing coatings, provides at least a 10% reduction in membrane to pin face friction, provides at least a 70% reduction in membrane to pin face friction, provides at least a 90% reduction in membrane to pin face friction, facilitates the use of dry process separator membranes, is combined with tension measuring and control to reduce damage to thin, high COF membranes, and/or combinations thereof.

In accordance with at least selected embodiments, aspects or objects, there are disclosed or provided new or improved pins adapted for use with high or higher COF polymer membranes or separator membranes (also known as sheets or films), polymer tension measuring, and/or related methods of use, of cell or battery manufacture, and/or the like. In certain embodiments, the new or improved pins are especially well suited for use with dry process polyolefin microporous membranes, separator membranes, or separators. In certain selected embodiments, the new or improved pins are especially well suited for use with dry process polyolefin microporous membranes, separator membranes, or separators in Z-fold or S-fold machines for the production of lithium ion pouch cells, lithium polymer pouch cells, lithium prismatic cells, and/or the like.

In accordance with at least selected embodiments, aspects or objects, there are disclosed or provided new or improved pins for use with high or higher COF polymer membranes or separator membranes (also known as sheets or films), polymer tension measuring, and/or related methods of use, of cell or battery manufacture, and/or the like as shown, described or claimed herein.

In accordance with at least selected embodiments, aspects or objects, there are disclosed or provided new or improved pins adapted for or especially well suited for use with dry process polyolefin microporous membranes, separator membranes, or separators as shown, described or claimed herein.

In accordance with at least selected embodiments, aspects or objects, there are disclosed or provided new or improved pins are especially well suited for use with dry process polyolefin microporous membranes, separator membranes, or separators in Z-fold or S-fold machines for the production of lithium ion pouch cells, lithium polymer pouch cells, lithium prismatic cells, and/or the like as shown, described or claimed herein.

In accordance with at least selected embodiments, aspects or objects, there are disclosed or provided new or improved pins that are contoured, shaped, designed, or modified to reduce the points of contact with the membrane or separator, to reduce the surface area of the pin, to reduce the face friction, to change the friction to a line friction, to change the friction to a point friction, to reduce the initial static friction force, includes contours, includes grooves, includes beads, includes pits, includes rollers, includes wheels, includes bearings, includes friction reducing materials, includes friction reducing coatings, provides at least a 10% reduction in membrane to pin face friction, provides at least a 70% reduction in membrane to pin face friction, provides at least a 90% reduction in membrane to pin face friction, facilitates the use of dry process separator membranes, may be made of low COF materials, may be combined with tension measuring and/or control to reduce damage to thin, high COF membranes, and/or combinations thereof.

The various embodiments, aspects and objects of new or improved pins, fingers or paddles adapted or suited for use with high COF polymer membranes or separator membranes (also known as sheets or films), polymer tension measuring, and/or related methods of use, of cell or battery manufacture, new or improved pins especially well suited or adapted for use with dry process polyolefin microporous membranes, separator membranes, or separators, new or improved pins especially well suited or adapted for use with dry process polyolefin microporous membranes, separator membranes, or separators in Z-fold or S-fold machines for the production of lithium ion pouch cells, lithium polymer pouch cells, lithium prismatic cells, and/or the like, are not limited to just those described or shown herein.

The invention claimed is:

1. Pins, fingers or paddles adapted for use with dry process polyolefin microporous membranes, separator membranes, or separators in Z-fold or S-fold machines for the production of lithium ion pouch cells, lithium polymer pouch cells or lithium prismatic cells, comprising at least one curved surface, wherein at least a portion of the at least one curved surface is in contact with the dry process polyolefin microporous membrane, separator membrane, or separator in the Z-fold or S-fold machine.

2. The pins, fingers or paddles of claim 1, wherein at least a portion of the at least one curved surface includes grooves, beads, pits, rollers, wheels, bearings, or combinations thereof.

3. The pins, fingers or paddles of claim 1 wherein the at least one curved surface is configured to reduce the points of contact with the membrane or separator, to reduce the surface area of the pin, to reduce the face friction, to change the friction to a line friction, to change the friction to a point friction, to reduce the initial static friction force, or combinations thereof.

4. A Z-fold or S-fold machine for the production of lithium ion pouch cells, lithium polymer pouch cells, and/or lithium prismatic cells, comprising the pins, fingers or paddles of claim 1.

5. The pins, fingers, or paddles of claim 1, wherein the pins, fingers, or paddles comprise a material with a low coefficient of friction (COF).

6. The pins, fingers, or paddles of claim 1, wherein the pins, fingers, or paddles further comprise a friction reducing coating.

7. The pins, fingers, or paddles of claim 1, wherein the pins, fingers, or paddles provide at least a 10% reduction in membrane to pin face friction.

8. Pins for use with high or higher COF polymer membranes or separator membranes, polymer tension measuring, and/or methods of cell or battery manufacture, comprising at least one curved surface, wherein at least a portion of the at least one curved surface is in contact with the polymer membrane or separator membrane.

9. The pins of claim 8, wherein the at least one curved surface is configured to reduce the surface area of the pin, to reduce the face friction, to change the friction to a line friction, to change the friction to a point friction, to reduce the initial static friction force, or combinations thereof.

10. The pins of claim 8, wherein the pins may be combined with tension measuring and/or control to reduce damage to thin, high COF membranes.

11. The pins of claim 8, wherein the pins comprise a material with a low coefficient of friction (COF).

12. The pins of claim 8, wherein the pins further comprise a friction reducing coating.

13. The pins of claim 8, wherein the pins provide at least a 10% reduction in membrane to pin face friction.

* * * * *